US012656662B2

(12) United States Patent
Ishii

(10) Patent No.: US 12,656,662 B2
(45) Date of Patent: Jun. 16, 2026

(54) REPLACEMENT MODULE CAPABLE OF PREVENTING FOREIGN MATTER FROM ENTERING WHEN IN ATTACHED STATE REGARDLESS OF USAGE ENVIRONMENT, ELECTRONIC APPARATUS, AND ELECTRONIC APPARATUS SET

(71) Applicant: CANON KABUSHIKI KAISHA, Tokyo (JP)

(72) Inventor: Kenji Ishii, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 95 days.

(21) Appl. No.: 18/618,246

(22) Filed: Mar. 27, 2024

(65) Prior Publication Data

US 2024/0353740 A1 Oct. 24, 2024

(30) Foreign Application Priority Data

Apr. 20, 2023 (JP) ................................. 2023-069175

(51) Int. Cl.
| | |
|---|---|
| *G03B 17/14* | (2021.01) |
| *H04N 23/51* | (2023.01) |
| *H04N 23/53* | (2023.01) |
| *H04N 23/54* | (2023.01) |

(52) U.S. Cl.
CPC ............. *G03B 17/14* (2013.01); *H04N 23/51* (2023.01); *H04N 23/531* (2023.01); *H04N 23/54* (2023.01)

(58) Field of Classification Search
CPC ........ G03B 17/14; H04N 23/51; H04N 23/54; H04N 23/531
See application file for complete search history.

(56) References Cited

U.S. PATENT DOCUMENTS

| | | | | |
|---|---|---|---|---|
| 6,097,511 A | * | 8/2000 | Hirasawa ............... | H04N 5/772 |
| | | | | 386/210 |
| 8,941,934 B2 | * | 1/2015 | Yang .................... | G03B 17/565 |
| | | | | 396/530 |
| 2005/0030410 A1 | * | 2/2005 | Tsukatani ............... | G03B 17/14 |
| | | | | 348/360 |

FOREIGN PATENT DOCUMENTS

JP 2020205060 A 12/2020

* cited by examiner

*Primary Examiner* — Minh Q Phan
(74) *Attorney, Agent, or Firm* — Cowan, Liebowitz & Latman, P.C.

(57) ABSTRACT

A replacement module capable of preventing foreign matter from entering when in an attached state regardless of a usage environment is provided. The replacement module that is replaceably attached to an electronic apparatus includes an exterior portion that constitutes a part of an exterior of the electronic apparatus in an attached state of being attached to the electronic apparatus, a connection portion communicably connected to the electronic apparatus in the attached state, a holding portion that holds the attached state, and an entering preventing portion that has a ring shape, in which the connection portion and the holding portion are disposed inside, and is configured by an elastic body that prevents foreign matter from entering the connection portion and the holding portion in the attached state. The connection portion, the holding portion, and the entering preventing portion are disposed on a surface facing a side opposite to the exterior portion.

13 Claims, 12 Drawing Sheets

REPLACEMENT MODULE CAPABLE OF PREVENTING FOREIGN MATTER FROM ENTERING WHEN IN ATTACHED STATE REGARDLESS OF USAGE ENVIRONMENT, ELECTRONIC APPARATUS, AND ELECTRONIC APPARATUS SET

BACKGROUND OF THE INVENTION

Field of the Invention

The present invention relates to a replacement module, an electronic apparatus, and an electronic apparatus set.

Description of the Related Art

For example, some portable game machines have a controller for performing game operations that is detachably attached to the main body device (the game machine main body) (for example, see Japanese Laid-Open Patent Publication (kokai) No. 2020-205060). A game machine disclosed in Japanese Laid-Open Patent Publication (kokai) No. 2020-205060 is able to be used in a state in which a controller is attached to the main body device, or is able to be used by the main body device alone without attaching the controller. As a result, the manner, in which the game machine is used, is able to be customized to suit a user's preferences. In addition, the controller of the game machine disclosed in Japanese Laid-Open Patent Publication (kokai) No. 2020-205060 includes a slide member that slides when being attached to or detached from the main body device, and a leaf spring-shaped connection terminal that is provided within the slide member and is communicably connected to the main body device in the state of being attached to the main body device.

However, since the controller of the game machine disclosed in Japanese Laid-Open Patent Publication (kokai) No. 2020-205060 has a structure designed to be used indoors by the user, for example, there has been an issue in that water proofness and dust proofness when used outdoors have not been taken into consideration.

SUMMARY OF THE INVENTION

The present invention provides a replacement module that is capable of preventing foreign matter from entering when in an attached state regardless of a usage environment, an electronic apparatus, and an electronic apparatus set.

Accordingly, the present invention provides a replacement module that is replaceably attached to an electronic apparatus, the replacement module comprising an exterior portion that constitutes a part of an exterior of the electronic apparatus in an attached state of being attached to the electronic apparatus, a connection portion that is communicably connected to the electronic apparatus in the attached state, a holding portion that holds the attached state, and an entering preventing portion that has a ring shape, in which the connection portion and the holding portion are disposed inside, and is configured by an elastic body that prevents foreign matter from entering the connection portion and the holding portion in the attached state. The connection portion, the holding portion, and the entering preventing portion are disposed on a surface facing a side opposite to the exterior portion.

According to the present invention, it is possible to prevent the foreign matter from entering when in the attached state regardless of the usage environment.

Further features of the present invention will become apparent from the following description of exemplary embodiments with reference to the attached drawings.

BRIEF DESCRIPTION OF THE DRAWINGS

FIG. 8 is a schematic view that shows a positional relationship between a replacement module according to a third embodiment of the present invention and the electronic apparatus when the replacement module according to the third embodiment of the present invention is viewed from the back side.

DESCRIPTION OF THE EMBODIMENTS

The present invention will now be described in detail below with reference to the accompanying drawings showing embodiments thereof.

Hereinafter, respective embodiments of the present invention will be described in detail with reference to the drawings. However, the configurations described in the following respective embodiments are merely examples, and the scope of the present invention is not limited by the configurations described in the following respective embodiments. For example, each part (each unit or each portion) constituting the present invention can be replaced with a part (a unit or a portion) having any configuration capable of performing similar functions. In addition, any component may be added. Moreover, it is also possible to combine any two or more configurations (features) of each embodiment.

Figure 1A:
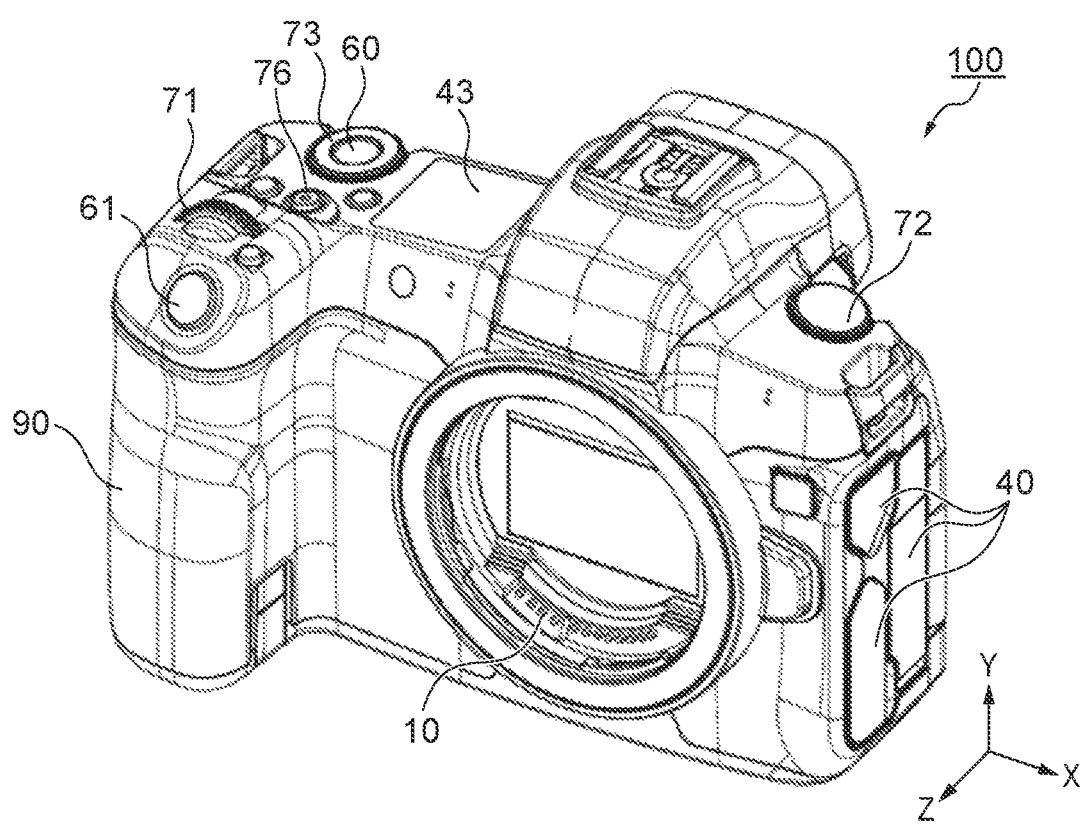
FIG. 1A is a front perspective view of a digital camera to which an electronic apparatus according to a first embodiment of the present invention is applied.

Hereinafter, a first embodiment of the present invention will be described with reference to FIGS. 1A to 6. FIG. 1A is a front perspective view of a digital camera 100 to which an electronic apparatus according to the first embodiment of the present invention is applied. As shown in FIG. 1A, the digital camera 100 includes an extra-finder display unit 43, a mode change-over switch 60, a shutter button 61, a main electronic dial 71, a power switch 72, a sub electronic dial 73, a moving image button 76, a communication terminal 10, and a gripping portion 90. The extra-finder display unit 43 is a display unit provided on the top surface of the digital camera 100. For example, setting values of image pickup conditions (photographing conditions) such as a shutter speed and an aperture are displayed on the extra-finder display unit 43. The mode change-over switch 60 is an operating portion for performing a switching operation for various kinds of modes such as a still image photographing mode and a moving image photographing mode. The shutter button 61 is an operating portion for issuing a photographing instruction. The main electronic dial 71 is a rotatably supported rotary operation unit. By performing a rotation operation of the main electronic dial 71, it is possible to change the image pickup conditions such as the shutter speed and the aperture. The power switch 72 is an operating portion for performing a switching operation switching between turning on the power of the digital camera 100 and turning off the power of the digital camera 100. The sub electronic dial 73 is a rotatably supported rotary operation unit. By performing a rotation operation of the sub electronic dial 73, it is possible to perform, for example, moving a selection frame, feeding images, etc. The moving image button 76 is an operating portion for issuing instructions to start and stop moving image photographing (moving image recording). The communication terminal 10 is a communication terminal for communicating with a lens unit 150 that is detachably attached to the digital camera 100. The gripping portion 90 is a holding portion formed in a shape that allows a user using the digital camera 100 to easily grip the digital camera 100 with his or her right hand when holding the digital camera 100. In addition, the shutter button 61, the main electronic dial 71, and the moving image button 76 are disposed at positions where the shutter button 61, the main electronic dial 71, and the moving image button 76 can be operated by the index finger of the right hand in a state where the gripping portion 90 is gripped with the little finger, the ring finger, and the middle finger of the right hand (hereinafter, referred to as "a gripped state"). Moreover, the sub electronic dial 73 is disposed at a position where the sub electronic dial 73 can be operated by the thumb of the right hand in the gripped state. Furthermore, the digital camera 100 includes a terminal cover 40 that can be opened and closed. In a closed state, the terminal cover 40 is able to protect a connector (not shown) that connects a connection cable with an external device and the digital camera 100.

Figure 1B:
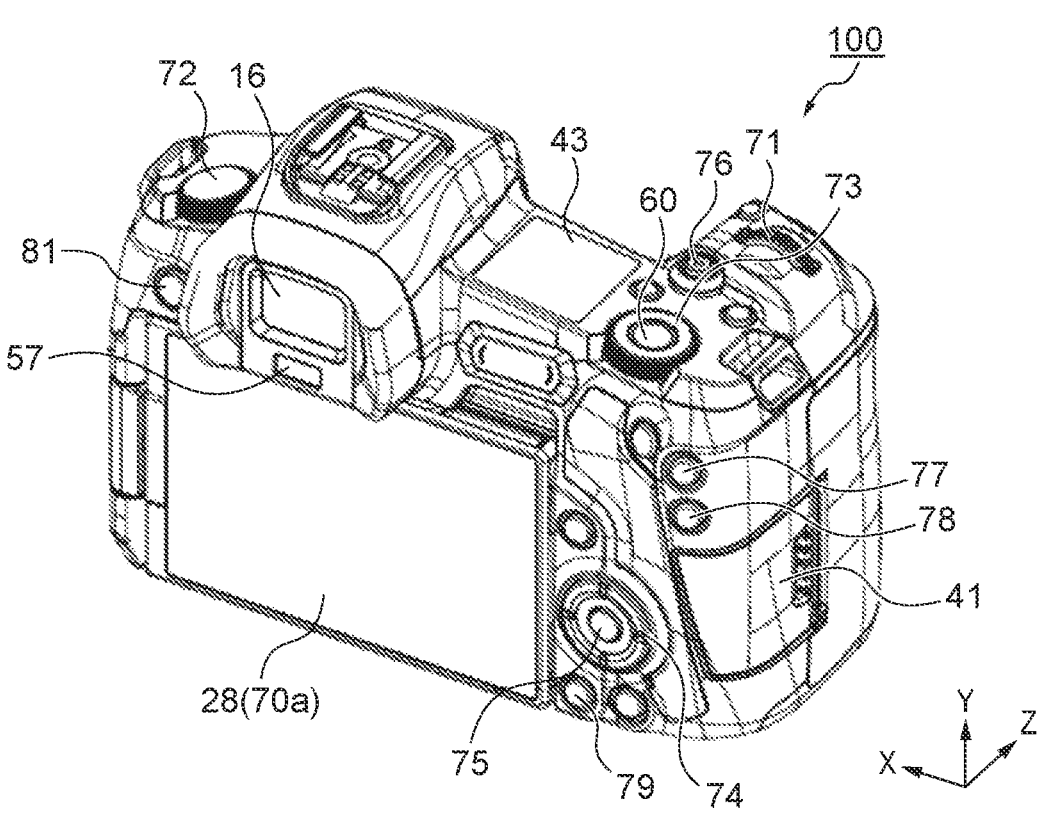
FIG. 1B is a rear perspective view of the digital camera shown in FIG. 1A.

FIG. 1B is a rear perspective view of the digital camera shown 100 in FIG. 1A. As shown in FIG. 1B, the digital camera 100 includes a display unit 28, a touch panel 70a, a cross key 74, a SET button 75, an auto exposure lock button (an AE lock button) 77, an enlargement button 78, a playback button 79, a menu button 81, an eyepiece portion 16, and an ocular detecting unit 57. The display unit 28 is provided on the back surface of the digital camera 100, and is a display unit that displays, for example, images and various kinds of information. The touch panel 70a is able to detect a touch operation on a display surface (an operation surface) of the display unit 28. The cross key 74 is a cross key (a four-direction key) whose upper, lower, left, and right portions can be pressed down, respectively. In addition, an operation corresponding to the pressed-down portion of the cross key 74 becomes possible. The SET button 75 is a push button mainly used for determining a selected item. It is possible to maintain an exposure state by pressing down the AE lock button 77 in a photographing standby state. The enlargement button 78 is an operation button for, in a live view display of the photographing mode, performing a switching operation switching between turning on an enlargement mode and turning off the enlargement mode. By operating the main electronic dial 71 after turning on the enlargement mode, a live view image can be enlarged or reduced. In addition, in a playback mode, the enlargement button 78 functions as an enlargement button for enlarging a playback image and increasing an enlargement rate of the playback image. The playback button 79 is an operation button for performing a switching operation switching between the photographing mode and the playback mode. By pressing down the playback button 79 during the photographing mode, shifting to the playback mode. As a result, it is possible to cause the display unit 28 to display the latest image among images recorded on a recording medium 200. By pressing down the menu button 81, various kinds of settable menu screens are displayed on the display unit 28. The user is able to intuitively perform various kinds of settings by using the menu screen displayed on the display unit 28, the cross key 74, and the SET button 75. The eyepiece portion 16 is an eyepiece portion of an eyepiece finder (a look-in type finder). The user is able to visually recognize (confirm) a video image displayed on an electronic view finder (an EVF: an intra-finder display unit) 29 disposed inside the eyepiece finder (the look-in type finder) through the eyepiece portion 16. The ocular detecting unit 57 is an ocular detecting sensor that detects whether or not an eye of a photographer (the user) is contacted with the eyepiece portion 16. Furthermore, the digital camera 100 includes a lid 41 that can be opened and closed. The lid 41 is a lid of a slot in which the recording medium 200 is housed.

Figure 2:
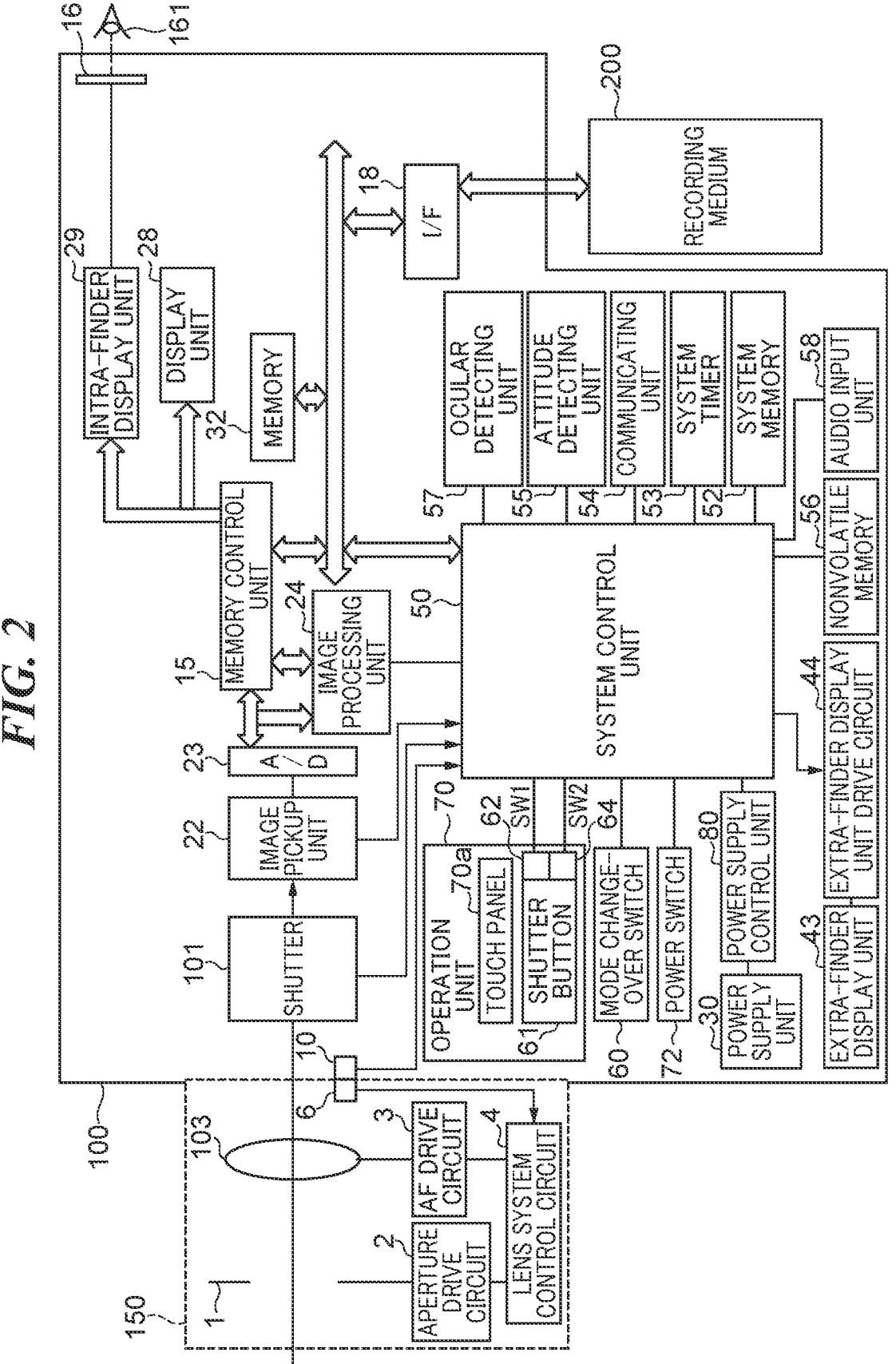
FIG. 2 is a block diagram that shows an example of a hardware configuration of the digital camera shown in FIG. 1A.

FIG. 2 is a block diagram that shows an example of a hardware configuration of the digital camera 100 shown in FIG. 1A. As shown in FIG. 2, the lens unit 150 is attached to the digital camera 100. The lens unit 150 is a replaceable lens unit with respect to the digital camera 100. The lens unit 150 includes a lens 103, an aperture 1, an aperture drive circuit 2, an AF drive circuit 3, and a lens system control circuit 4. The lens 103 is normally configured by a plurality of lenses, but in the configuration shown in FIG. 2, only one lens is shown for simplicity. A communication terminal 6 is a communication terminal that is connected to the communication terminal 10 of the digital camera 100 when the lens unit 150 is attached to the digital camera 100. By this connection, it is possible to perform communication between a system control unit 50 of the digital camera 100 and the lens system control circuit 4 of the lens unit 150. The lens system control circuit 4 performs the control of the aperture 1 via the aperture drive circuit 2. In addition, the lens system control circuit 4 performs focusing by displacing the lens 103 via the AF drive circuit 3.

As shown in FIG. 2, the digital camera 100 includes a shutter 101, the system control unit 50, an image pickup unit 22, an A/D converter 23, an image processing unit 24, a memory control unit 15, a memory 32, the EVF 29, the extra-finder display unit 43. The shutter 101 is a focal plane shutter that can adjust an exposure time of the image pickup unit 22 as appropriate under the control of the system control unit 50. The image pickup unit 22 is an image pickup device configured with a CCD solid-state image pickup device or a CMOS solid-state image pickup device that converts an optical image into electrical signals. The A/D converter 23 converts analog signals outputted from the image pickup unit 22 into digital signals. The image processing unit 24 performs prescribed processing (for example, a pixel interpolation processing, a resizing processing such as a reducing processing, a color conversion processing, etc.) with respect to data from the A/D converter 23 or data from the memory control unit 15. In addition, in the image processing unit 24, it is also possible to perform a prescribed calculating processing by using picked-up image data obtained by the image pickup unit 22. The system control unit 50 performs exposure control and ranging control (range-finding control) based on a calculation result obtained by the image processing unit 24. As a result, an autofocus processing (an AF processing), an auto exposure processing (an AE processing), and a preliminary light emission before flash processing (an EF processing) in a through the lens system (a TTL system) are performed. In addition, the image processing unit 24 is also able to perform an automatic white balance processing (an AWB processing) in the TTL system based on the calculation result obtained by the image processing unit 24. The memory control unit 15 controls data transmission and reception between the A/D converter 23, the image processing unit 24, and the memory 32. The output data from the A/D converter 23 is directly written into the memory 32 via the image processing unit 24 and the memory control unit 15 or via the memory control unit 15. The memory 32 stores image data converted by the A/D converter 23, image data to be displayed on the display unit 28 and the EVF 29, etc. The memory 32 has a sufficient storage capacity for storing a prescribed number of still images, a prescribed time of moving images and audio, etc. In addition, the memory 32 also functions as a memory for image display (a video image memory). The image data for image display that has been written into the memory 32 is displayed on the display unit 28 and the EVF 29 via the memory control unit 15. The display unit 28 and the EVF 29 each perform a display according to a signal from the memory control unit 15 on a display such as an LCD or an organic EL display. In the digital camera 100, the data, which has been A/D converted by the A/D converter 23 and has been accumulated in the memory 32, is sequentially transferred to the display unit 28 or the EVF 29 and is displayed on the display unit 28 or the EVF 29. As a result, it is possible to perform the live view display (an LV display). An image displayed in live view is referred to as, for example, "a live view image (an LV image)". Under the control of an extra-finder display unit drive circuit 44, for example, the setting values of the image pickup conditions such as the shutter speed and the aperture are displayed on the extra-finder display unit 43.

In addition, the digital camera 100 includes the extra-finder display unit drive circuit 44, a system memory 52, a nonvolatile memory 56, a system timer 53, and an operation unit 70. The nonvolatile memory 56 is an electrically erasable/recordable memory, and as the nonvolatile memory 56, for example, a flash ROM or the like is used. The nonvolatile memory 56 stores constants, programs, etc. that are necessary for the operations of the system control unit 50. The system control unit 50 is a control unit including at least one processor or circuit, and controls the entire digital camera 100. The system control unit 50 is able to execute the program recorded (stored) in the nonvolatile memory 56. As the system memory 52, for example, a RAM is used, and the constants and variables for the operations of the system control unit 50, the program read out from the nonvolatile memory 56, and the like are loaded into the system memory

52. Furthermore, the system control unit 50 has the function as a display control means (a display control unit). The system control unit 50 also performs display control by controlling the memory 32, the display unit 28, the EVF 29, etc. The system timer 53 is a time-measuring unit for measuring a time used in various kinds of controls and measuring a time or the like of a built-in clock. Similar to the mode change-over switch 60, etc., the operation unit 70 is an operation means for inputting various kinds of operation instructions into the system control unit 50. As described above, by using the mode change-over switch 60, it is possible to perform the switching operation for various kinds of modes such as the still image photographing mode and the moving image photographing mode. As modes included in the still image photographing mode, for example, there are an automatic photographing mode, an automatic scene determination mode, a manual mode, an aperture priority mode (an Av mode), a shutter speed priority mode (a Tv mode), and a program AE mode (a P mode). Furthermore, modes that can be switched by the mode change-over switch 60 include various scene modes that become photographing settings for different photographing scenes, various custom modes, etc. The operation unit 70 includes a first shutter switch 62 and a second shutter switch 64. The first shutter switch 62 is turned on in the middle of an operation of the shutter button 61 by a so-called half-pressing (i.e., a photographing preparation instruction) and generates a first shutter switch signal SW1. Upon receiving the first shutter switch signal SW1, photographing preparation operations such as the AF processing, the AE processing, the AWB processing, the EF processing, etc. are started. The second shutter switch 64 is turned on when the operation of the shutter button 61 is completed by a so-called full-pressing (i.e., a photographing instruction) and generates a second shutter switch signal SW2. Upon receiving the second shutter switch signal SW2, operations of a series of photographing processing from reading out signals from the image pickup unit 22 to writing the picked-up image as an image file into the recording medium 200 are started. In addition, the operation unit 70 includes the shutter button 61 and the touch panel 70*a*. Furthermore, the operation unit 70 also includes the main electronic dial 71, the power switch 72, the sub electronic dial 73, the cross key 74, the SET button 75, the moving image button 76, the AE lock button 77, the enlargement button 78, the playback button 79, and the menu button 81.

In addition, the digital camera 100 includes a power supply control unit 80, a power supply unit 30, a recording medium interface (a recording medium I/F) 18, a communicating unit 54, an attitude detecting unit 55, and the ocular detecting unit 57. The power supply control unit 80 includes a battery detection circuit (not shown), a DC-DC converter (not shown), a switching circuit (not shown) for switching between blocks to be energized, etc., and performs detection of whether or not a battery has been attached, a type of the battery, and a remaining battery level. In addition, the power supply control unit 80 controls the DC-DC converter based on an instruction from the system control unit 50, and the like. As a result, necessary voltages are supplied to respective units including the recording medium 200 for necessary periods of time. The power supply unit 30 is configured by, for example, a primary battery such as an alkaline battery or a lithium battery, a secondary battery such as a NiCd battery, a NiMH battery, or a lithium-ion battery, an AC adapter, or the like. The recording medium I/F 18 is an interface with the recording medium 200 that is a memory card, a hard disk, or the like. The recording medium 200 is a recording medium such as a memory card for recording the photographed images, and is, for example, a semiconductor memory, a magnetic disk, or the like. The communicating unit 54 is connected wirelessly or by a cable, and transmits and receives video image signals and audio signals in the connected state. The communicating unit 54 is also capable of being connected to a wireless local area network (a wireless LAN) or the Internet. In addition, the communicating unit 54 is capable of communicating with an external device via Bluetooth (registered trademark) or Bluetooth Low Energy. The communicating unit 54 is capable of transmitting images (including LV images) picked up by the image pickup unit 22 and images recorded on the recording medium 200. In addition, the communicating unit 54 is capable of receiving images and other various types of information from the external device. The attitude detecting unit 55 detects an attitude of the digital camera 100 with respect to a direction of gravitational force. Based on a detection result obtained by the attitude detecting unit 55, the system control unit 50 is able to determine whether the image photographed by the image pickup unit 22 is an image photographed while holding the digital camera 100 horizontally or an image photographed while holding the digital camera 100 vertically. The system control unit 50 is able to add the detection result obtained by the attitude detecting unit 55, that is, information regarding the attitude of the digital camera 100 to an image file of the picked-up image. An acceleration sensor, a gyro sensor, or the like can be used as the attitude detecting unit 55. In this case, the attitude detecting unit 55 is also able to detect a movement of the digital camera 100 (panning, tilting, lifting, whether or not it is stationary, etc.). The ocular detecting unit 57 is the ocular detecting sensor, which detects approaching (eye-contacting) and separating (eye-separation) of an eye 161 with respect to the eyepiece portion 16 of the eyepiece finder. The system control unit 50 switches display (a display state)/non-display (a non-display state) of the display unit 28 and the EVF 29 in accordance with a detection result obtained by the ocular detecting unit 57.

Figure 3A:
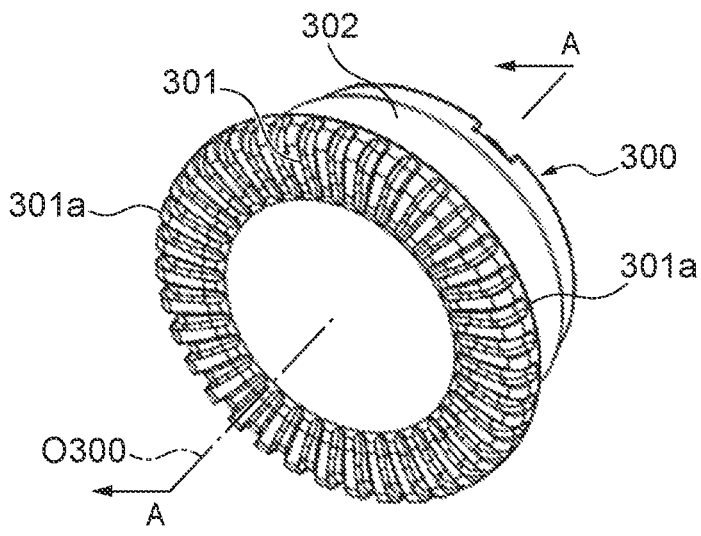
FIG. 3A is a perspective view of a replacement module that is replaceably attached to the digital camera, when viewed from the front side.
Figure 3B:
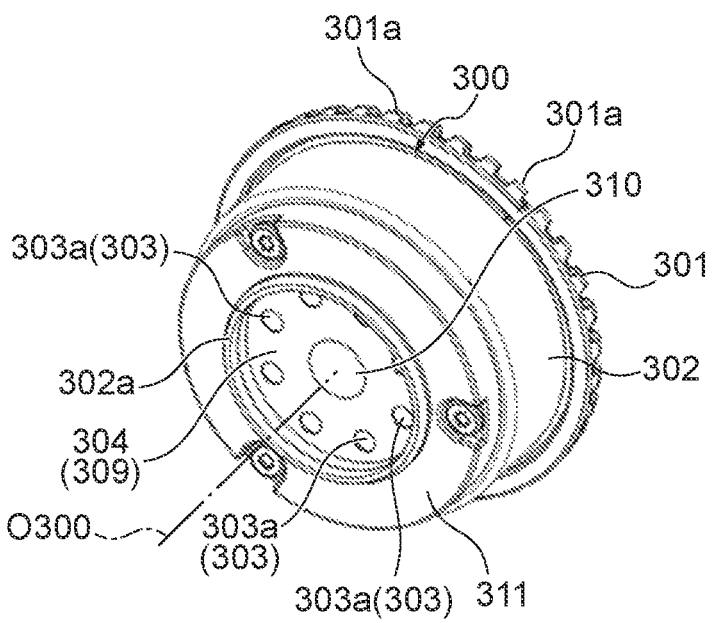
FIG. 3B is a perspective view of the replacement module shown in FIG. 3A when viewed from the back side.
Figure 4:
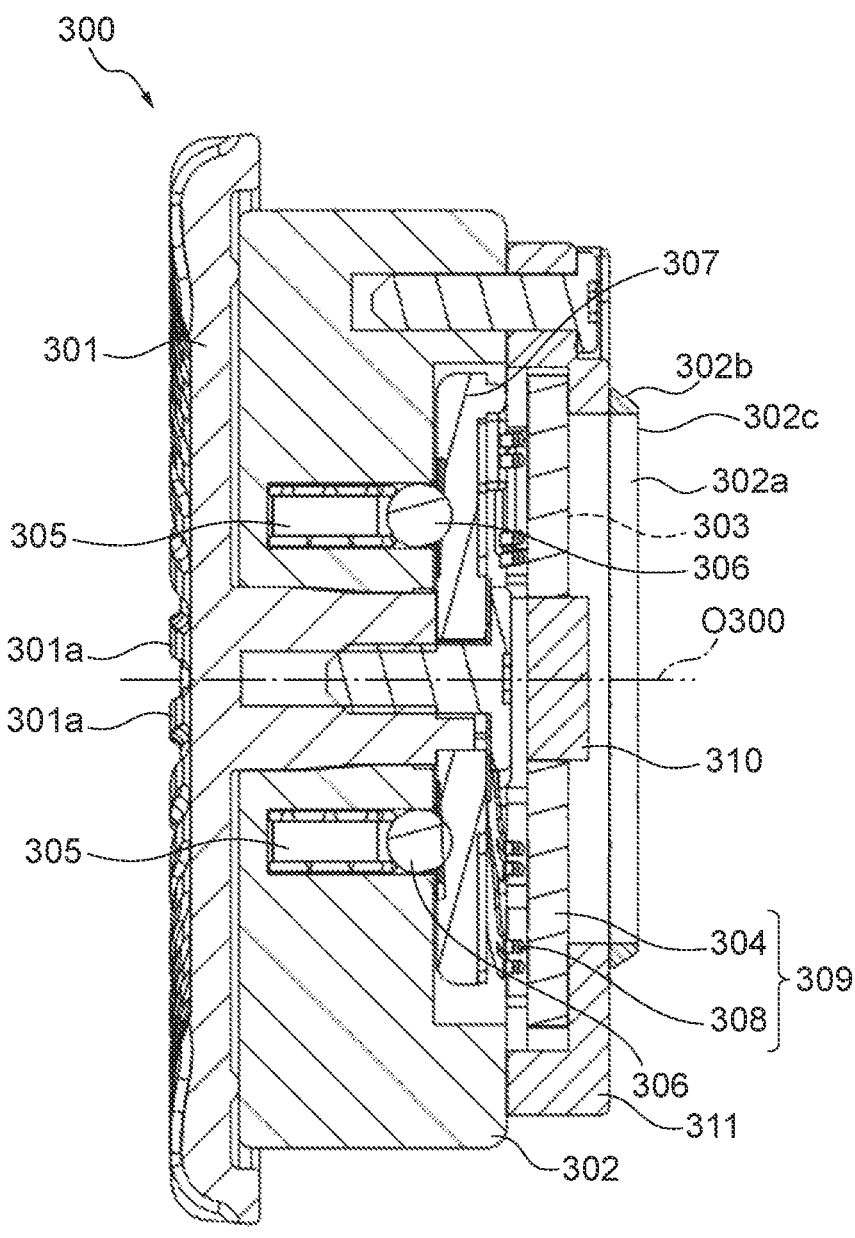
FIG. 4 is a cross-sectional view taken along a line A-A of FIG. 3A.
Figure 5:
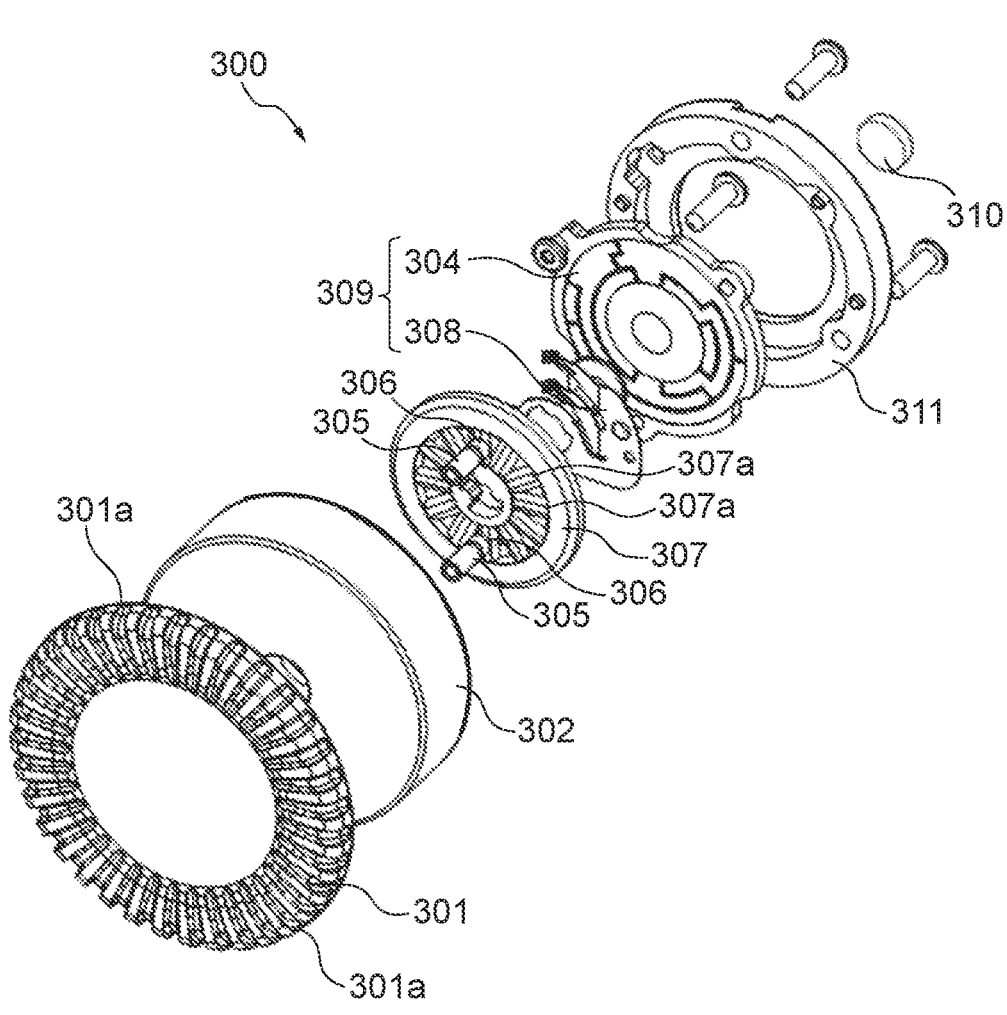
FIG. 5 is an exploded perspective view of the replacement module shown in FIG. 3A.

FIG. 3A is a perspective view of a replacement module 300 that is replaceably attached to the digital camera 100, when viewed from the front side. FIG. 3B is a perspective view of the replacement module 300 shown in FIG. 3A when viewed from the back side. FIG. 4 is a cross-sectional view taken along a line A-A of FIG. 3A. FIG. 5 is an exploded perspective view of the replacement module 300 shown in FIG. 3A. The replacement module 300 shown in FIGS. 3A and 3B is replaceably attached to the digital camera 100, which is the electronic apparatus, and constitutes an electronic apparatus set 1000 together with the digital camera 100. That is, the electronic apparatus set 1000 includes the replacement module 300, and the digital camera 100 to which the replacement module 300 is replaceably attached. In the first embodiment of the present invention, the replacement module 300 is used to replace the cross key 74 of the digital camera 100. The replacement module 300 is rotatably operated around a central axis O300 in a state in which the replacement module 300 is attached to the digital camera 100 (hereinafter, referred to as "an attached state"). Through this rotation operation, the replacement module 300 is able to perform the same function as when the cross key 74 is operated.

As shown in FIG. 3A, the replacement module 300 includes a disc-shaped exterior portion (an external appearance portion) 301 that constitutes a part of an exterior of the digital camera 100 in the attached state, and a casing 302 that is provided concentrically with the exterior portion 301.

Hereinafter, a side facing the exterior portion 301 will be referred to as "the front side", and the opposite side will be referred to as "the back side". The exterior portion 301 functions as a finger rest portion on which fingers can be rested when the rotation operation of the replacement module 300 is performed. In addition, a plurality of ribs 301a arranged radially are protrudingly formed on the exterior portion 301. Thereby, the fingers can be reliably hooked onto the exterior portion 301 when the rotation operation of the replacement module 300 is performed, and thus it is possible to easily perform the rotation operation. The casing 302 is disposed on the back side of the exterior portion 301. As shown in FIG. 4, the casing 302 supports the exterior portion 301 so that the exterior portion 301 is rotatable around the central axis O300.

As shown in FIG. 3B, the replacement module 300 includes a detection board 304, a holding portion 310 that holds the attached state, and an entering preventing portion (a drip-proof portion) 302a that prevents foreign matter from entering when in the attached state. The detection board 304 is a circuit board that constitutes a detecting unit 309 that detects the rotation operation of the replacement module 300 together with a detection metal sheet 308 that will be described below. As shown in FIGS. 4 and 5, the detection board 304 is fixed to the casing 302 via a ring-shaped frame body 311 that is screwed to the casing 302. The detection board 304 is provided with a connection portion 303 that is communicably connected to the digital camera 100 in the attached state. The connection portion 303 is configured by a plurality of communication contacts 303a arranged at equal intervals around the central axis O300. The plurality of communication contacts 303a are able to come into contact with a plurality of communication terminals 402 of the digital camera 100, which will be described below.

In addition, the holding portion 310 is disposed at a position overlapping the central axis O300. The holding portion 310 is configured by a disc-shaped permanent magnet (a magnet), and is attracted to a holding portion 405 of the digital camera 100, which will be described below, in the attached state. As a result, the replacement module 300 is held in the digital camera 100. At this time, the communication contact 303a and the communication terminal 402 come into contact, and communication between the replacement module 300 and the digital camera 100 becomes possible. Furthermore, by disposing the holding portion 310 at the position overlapping the central axis O300, it is possible to stably maintain the attached state of the replacement module 300. It should be noted that an orientation of the permanent magnet that constitutes the holding portion 310 depends on a constituent material of the holding portion 405, but for example, in the case that the holding portion 405 is configured by (is made of) martensitic stainless steel or the like, the north pole of the permanent magnet that constitutes the holding portion 310 may face the back side, or the south pole of the permanent magnet that constitutes the holding portion 310 may face the back side. Moreover, in the case that the holding portion 405 is configured by a permanent magnet, the orientation of the permanent magnet that constitutes the holding portion 310 is determined according to the polarity of the permanent magnet that constitutes the holding portion 405. It should be noted that the holding portion 310 is not limited to being configured by (being made of) a permanent magnet, but may be configured by, for example, a mechanically operated locking mechanism.

Similar to the detection board 304 and the holding portion 310, the entering preventing portion 302a is disposed on the back side of the exterior portion 301. It should be noted that the configuration and operation of the entering preventing portion 302a will be described below.

As shown in FIGS. 4 and 5, the replacement module 300 includes click springs 305, spherical bodies 306, a rotary plate 307, and the detection metal sheet 308. The rotary plate 307 is a disc-shaped member that is disposed concentrically on the back side of the exterior portion 301 and is fastened to the exterior portion 301 with screws. The rotary plate 307 rotates around the central axis O300 together with the exterior portion 301. The two spherical bodies 306 abut on the front side of the rotary plate 307. The two spherical bodies 306 are disposed side by side on both sides of the central axis O300. Each spherical body 306 is biased toward the rotary plate 307 by the click spring 305. The click spring 305 is configured by a coil spring, and is disposed between the spherical body 306 and the casing 302 in a compressed state. In addition, a plurality of ribs 307a arranged radially are protrudingly formed on the front surface of the rotary plate 307. Furthermore, when the replacement module 300 (the exterior portion 301) is rotatably operated, each spherical body 306 is able to overcome a biasing force of the click spring 305 and overcome the ribs 307a one by one. As a result, an operator who has rotatably operated the replacement module 300 is able to feel a click feeling and is able to stop the replacement module 300 at a predetermined rotation angle. It should be noted that the spherical body 306 is preferably made of a metal material such as stainless steel. The detection metal sheet 308 is disposed on the back side of the rotary plate 307 and is fastened to the rotary plate 307 with screws. Similar to the rotary plate 307, the detection metal sheet 308 also rotates around the central axis O300 together with the exterior portion 301. With this rotation, the detection metal sheet 308 slides on the front surface of the detection board 304. Then, a signal detected by the detection board 304 is transmitted to the digital camera 100 via the communication contacts 303a as a detection result of the rotation operation of the replacement module 300.

Figure 6A:
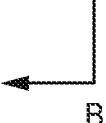
FIG. 6A is a plan view of the replacement module in a state of being attached to the digital camera, when viewed from the front side.
Figure 6B:
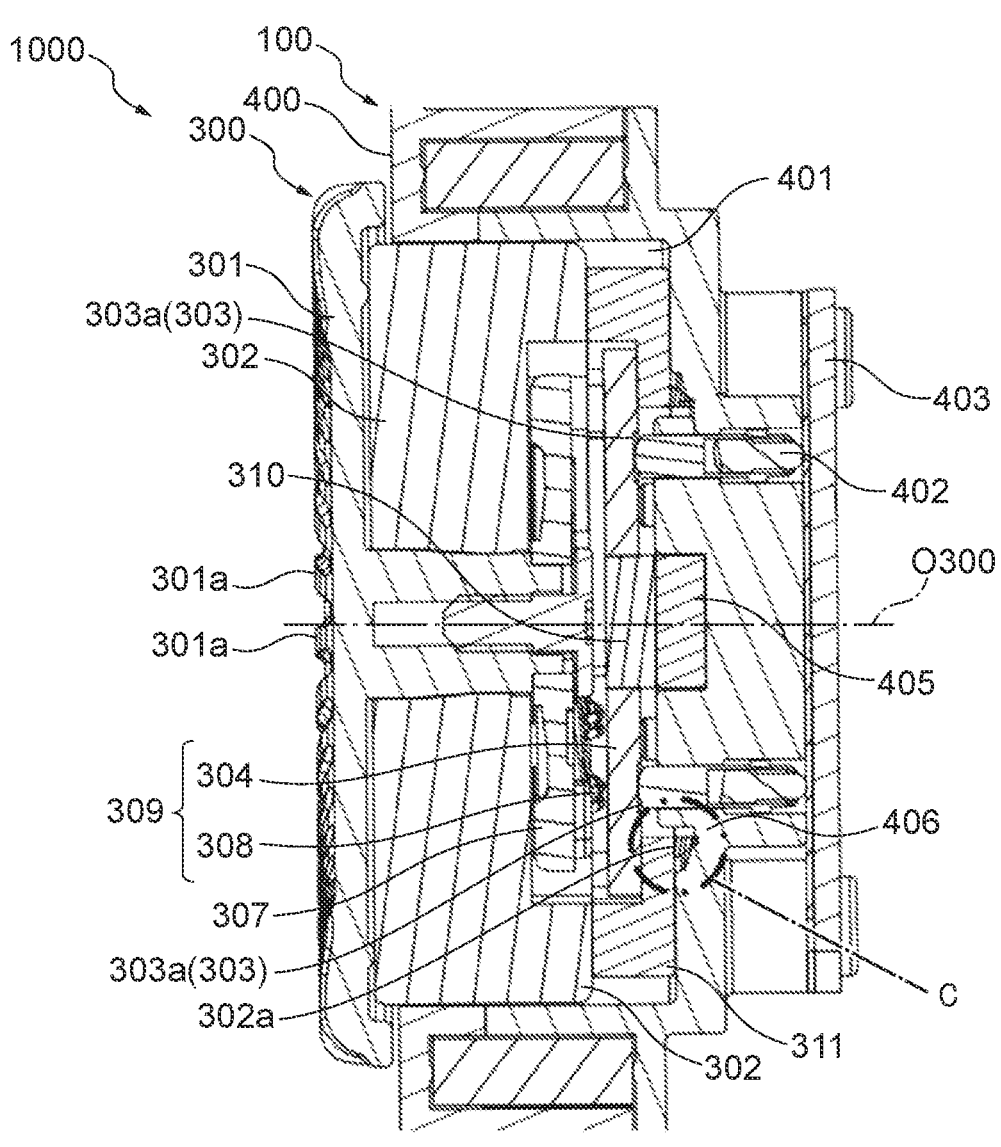
FIG. 6B is a cross-sectional view taken along a line B-B of FIG. 6A.
Figure 6C:
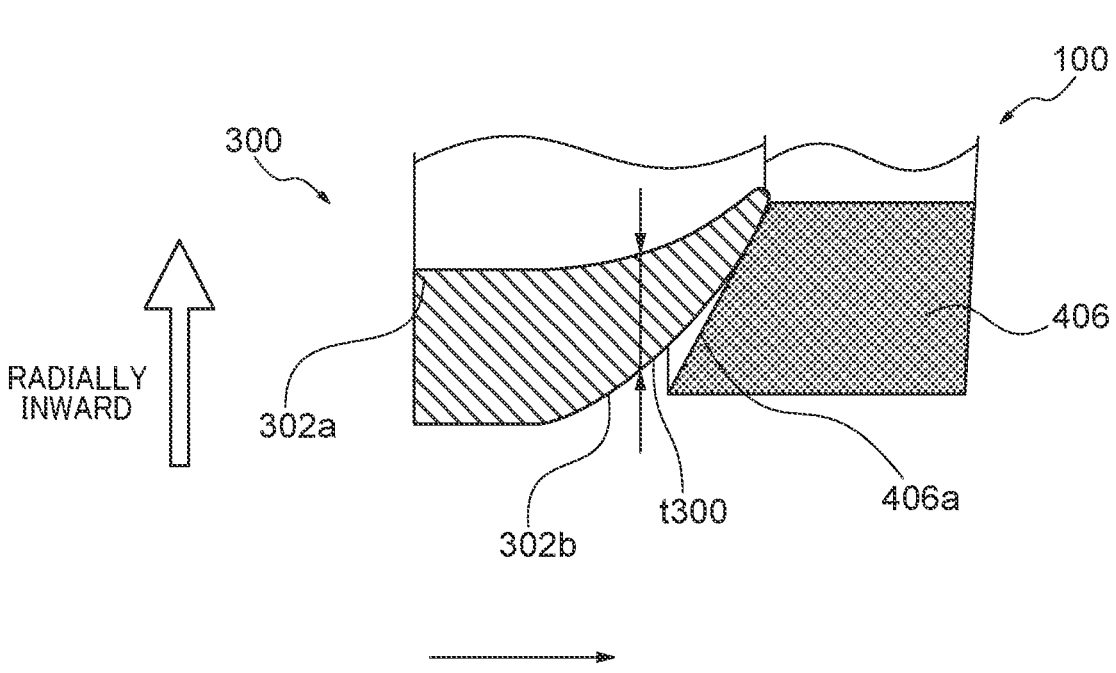
FIG. 6C is an enlarged schematic view of an area C surrounded by a dash-dot line of FIG. 6B.

FIG. 6A is a plan view of the replacement module 300 in the state of being attached to the digital camera 100, when viewed from the front side. FIG. 6B is a cross-sectional view taken along a line B-B of FIG. 6A. FIG. 6C is an enlarged schematic view of an area C surrounded by a dash-dot line of FIG. 6B. As shown in FIGS. 6A and 6B, a recess portion 401 is provided in a rear casing 400 of the digital camera 100. It is possible to insert the replacement module 300 into the recess portion 401. As a result, the replacement module 300 becomes the attached state. In addition, the digital camera 100 includes the plurality of communication terminals 402, a communication board 403, and the holding portion 405. Each communication terminal 402 is connected to the communication contact 303a of the replacement module 300 in the attached state. The communication board 403 is a circuit board that is communicably connected to the system control unit 50 and is also connected to each communication terminal 402. As a result, the replacement module 300 becomes able to communicate with the system control unit 50 of the digital camera 100 via the communication contacts 303a, the communication terminals 402, and the communication board 403 in the attached state. The holding portion 405 is attracted to the holding portion 310 of the replacement module 300 in the attached state. As a result, it is possible to maintain the attached state of the replacement module 300. It should be noted that the holding portion 405 is not particularly limited as long as it is attracted to the holding portion 310, and for example, may be made of a metal material (martensitic stainless steel or the like), or may be made of a permanent magnet.

As described above, the replacement module 300 includes the entering preventing portion 302a disposed on the back side of the exterior portion 301. The entering preventing portion 302a prevents foreign matter from entering when in the attached state. As shown in FIG. 6B, the entering preventing portion 302a is a ring-shaped member (a circular annular-shaped member) disposed on the back surface of the frame body 311 concentrically with the frame body 311. In addition, the entering preventing portion 302a protrudes toward an insertion direction of the replacement module 300 with respect to the digital camera 100, that is, protrudes toward the back side. The entering preventing portion 302a is configured by an elastic body (is made of an elastic material), and is integrally formed with the frame body 311 by two-color molding (dual molding). The elastic material constituting the entering preventing portion 302a is not particularly limited, and examples of the elastic material constituting the entering preventing portion 302a include various kinds of rubber materials such as urethane rubber, silicone rubber, and fluorine rubber, and various kinds of thermoplastic elastomers such as polyvinyl chloride system. The connection portion 303 and the holding portion 310 are disposed inside the ring-shaped entering preventing portion 302a. It should be noted that the entering preventing portion 302a, the connection portion 303, and the holding portion 310 are all disposed on a surface facing a side opposite to the exterior portion 301 (a surface facing the opposite side to the exterior portion 301), that is, a surface facing the back side.

On the other hand, the digital camera 100 includes an abutting portion 406 that abuts on the entering preventing portion 302a in the attached state. The abutting portion 406 has a ring shape (a circular annular shape) centered on the central axis O300, and compresses the entering preventing portion 302a toward a direction opposite to the insertion direction of the replacement module 300 in the attached state, that is, compresses the entering preventing portion 302a toward the front side in the attached state. As a result, the entering preventing portion 302a is elastically deformed and comes into surface contact with the abutting portion 406. The range of surface contact is a range that goes around the central axis O300. Furthermore, due to this surface contact, regardless of a usage environment of the digital camera 100 (an environment in which the digital camera 100 is used), that is, regardless of whether the digital camera 100 is used outdoors or indoors, it is possible to prevent foreign matter from entering the connection portion 303 and the holding portion 310 when in the attached state, thereby protecting the connection portion 303 and the holding portion 310. As a result, it is possible to stably operate the replacement module 300, and the digital camera 100 is able to receive commands from the operation of the replacement module 300. It should be noted that "the foreign matter" includes, for example, liquid such as water and dust such as powder dust.

As shown in FIG. 4, a protruding top portion 302c of the entering preventing portion 302a is located at a higher position than the connection portion 303 and the holding portion 310, that is, the protruding top portion 302c is located on the back side. As a result, even in the case that the replacement module 300 that has not yet been attached to the digital camera 100 is dropped and receives a shock, the entering preventing portion 302a can collide with the collision destination before the connection portion 303 and the holding portion 310. As a result, it is possible to protect the connection portion 303 and the holding portion 310.

In addition, as shown in FIGS. 4 and 6C, the entering preventing portion 302a has a tapered surface (a first tapered surface) 302*b* whose outer diameter gradually decreases toward the insertion direction, that is, the entering preventing portion 302*a* has the tapered surface 302*b* that is inclined with respect to the central axis O300. On the other hand, the abutting portion 406 of the digital camera 100 has a tapered surface (a second tapered surface) 406*a* that is inclined in the same direction as the tapered surface 302*b*. As a result, the entering preventing portion 302*a* is elastically deformed by the tapered surface 302*b* being compressed radially inward by the tapered surface 406*a* in the attached state. Due to this deformation, the tapered surface 302*b* and the tapered surface 406*a* come into surface contact with each other. Moreover, due to a synergistic effect of this radially inward compression and the above-mentioned compression of the entering preventing portion 302*a* to the front side, regardless of the usage environment of the digital camera 100, it is possible to more reliably prevent foreign matter from entering when in the attached state. In addition, a thickness t300 of the entering preventing portion 302*a* is reduced by the tapered surface 302*b*. As a result, it is possible to reduce a resistance force caused by the deformation of the entering preventing portion 302*a* that occurs when the replacement module 300 is attached, and therefore, it is possible to easily perform the attachment of the replacement module 300.

Figure 6D:
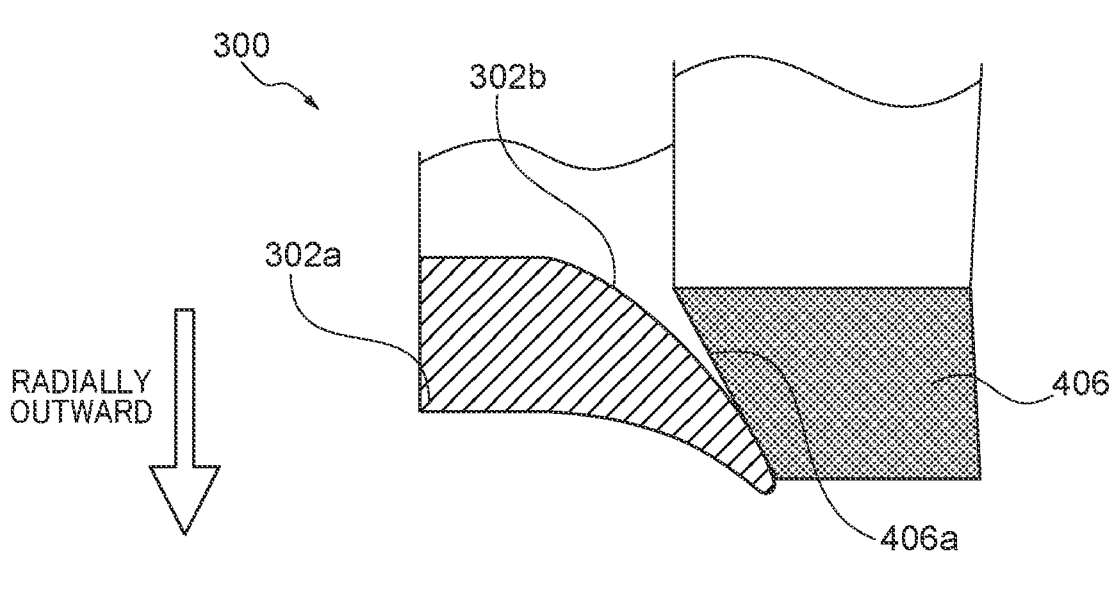
FIG. 6D is an enlarged schematic view that shows a modification of an entering preventing portion.

Hereinafter, a modification of the entering preventing portion will be described with reference to FIG. 6D, but the description will focus on the differences from the first embodiment described above, and the description of similar matters will be omitted. FIG. 6D is an enlarged schematic view that shows the modification of the entering preventing portion. As shown in FIG. 6D, in the modification of the entering preventing portion, the tapered surface 302*b* is a tapered surface in which an inner diameter of the entering preventing portion 302*a* gradually increases toward the insertion direction. In this case, the tapered surface 406*a* of the abutting portion 406 of the digital camera 100 is inclined in the same direction as the tapered surface 302*b*. Furthermore, the entering preventing portion 302*a* is elastically deformed by the tapered surface 302*b* being compressed radially outward by the tapered surface 406*a* in the attached state. As a result, the tapered surface 302*b* and the tapered surface 406*a* come into surface contact with each other, and hence, it is possible to prevent foreign matter from entering when in the attached state.

Figure 7:
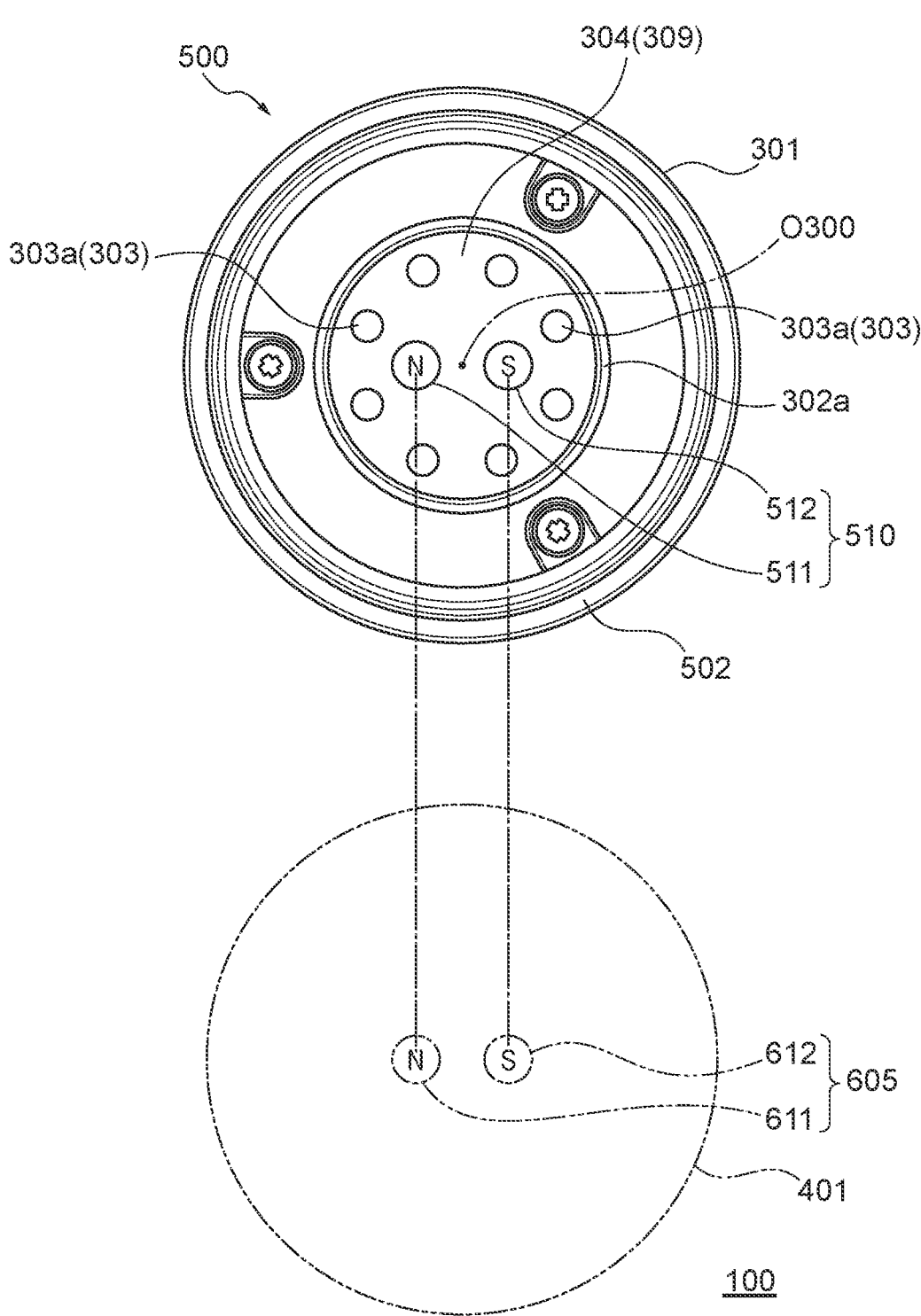
FIG. 7 is a view that shows a positional relationship between a replacement module according to a second embodiment of the present invention and the electronic apparatus when the replacement module according to the second embodiment of the present invention is viewed from the back side.

Hereinafter, a second embodiment of the present invention will be described with reference to FIG. 7, but the description will focus on the differences from the first embodiment described above, and the description of similar matters will be omitted. FIG. 7 is a view that shows a positional relationship between a replacement module according to the second embodiment of the present invention and the electronic apparatus when the replacement module according to the second embodiment of the present invention is viewed from the back side. As shown in FIG. 7, a replacement module 500 includes a holding portion 510 disposed on the back side of a casing 502. The holding portion 510 is configured by a magnet 511 and a magnet 512. The magnet 511 and the magnet 512 are disposed side by side on both sides of the central axis O300 (along a direction of the surface facing the back side). In addition, directions of magnetic forces of the magnet 511 and the magnet 512 are opposite to each other. In the second embodiment, the north pole of the magnet 511 faces the back side, and the south pole of the magnet 512 faces the back side. It should be noted that although in the second embodiment, the holding portion 510 is configured by two magnets, the magnet 511 and the magnet 512, it is not limited to this, and for example, may be configured by three or more magnets.

On the other hand, the digital camera 100 includes a holding portion 605 to which the holding portion 510 is attracted when in the attached state. The holding portion 605 is configured by a magnet 611 and a magnet 612. The south pole of the magnet 611 faces the front side, and the north pole of the magnet 612 faces the front side. As a result, in the attached state, the magnet 511 and the magnet 611 are attracted to each other, and the magnet 512 and the magnet 612 are also attracted to each other. Such a configuration is effective in the case that an orientation (an attachment orientation) of the replacement module 500 with respect to the digital camera 100 has been determined. As a result, it is possible to prevent the replacement module 500 from being attached in a wrong orientation (it is possible to prevent reverse insertion of the replacement module 500).

Figure 8:
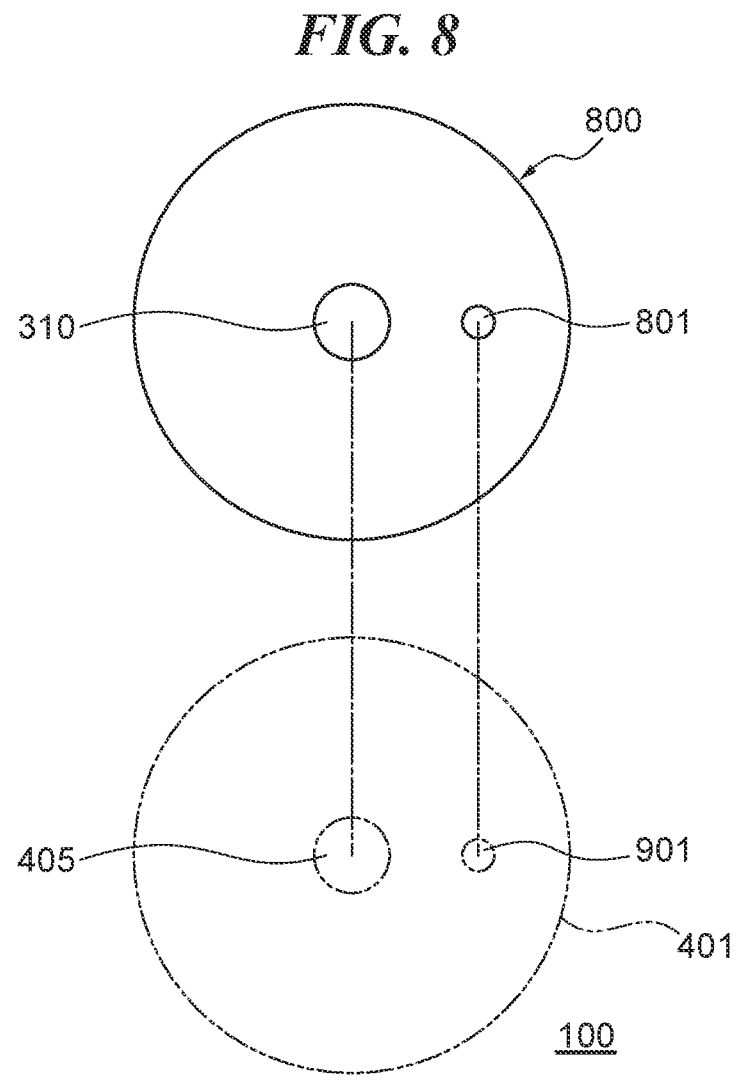
Figure 9:
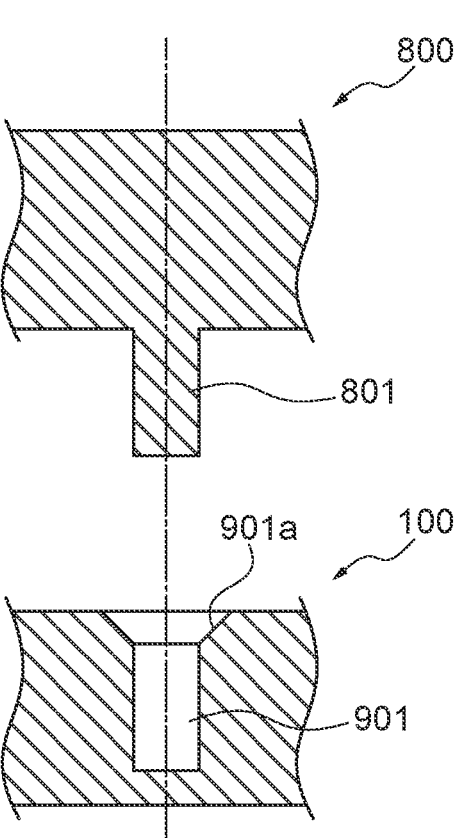
FIG. 9 is a schematic cross-sectional view that shows the positional relationship between the replacement module shown in FIG. 8 and the electronic apparatus.

Hereinafter, a third embodiment of the present invention will be described with reference to FIGS. 8 and 9, but the description will focus on the differences from the first embodiment and the second embodiment that have been described above, and the description of similar matters will be omitted. FIG. 8 is a schematic view that shows a positional relationship between a replacement module according to the third embodiment of the present invention and the electronic apparatus when the replacement module according to the third embodiment of the present invention is viewed from the back side. FIG. 9 is a schematic cross-sectional view that shows the positional relationship between the replacement module shown in FIG. 8 and the electronic apparatus. As shown in FIGS. 8 and 9, a replacement module 800 includes a regulating portion 801 that regulates an orientation (an attachment orientation) of the replacement module 800 with respect to the digital camera 100 in the attached state. The regulating portion 801 is disposed at a position eccentric from the holding portion 310 in the center. In the third embodiment, the regulating portion 801 is configured by a convex portion that protrudes in a columnar manner toward the back side.

On the other hand, the digital camera 100 includes an engaging portion 901 that engages with the regulating portion 801 in the attached state. In the third embodiment, the engaging portion 901 is configured by a recess portion into which the regulating portion 801 is inserted. In addition, an opening portion of the engaging portion 901 is formed with a tapered surface 901*a* whose inner diameter gradually increases toward the front side. As a result, when attaching the replacement module 800, it is possible to easily insert the regulating portion 801 into the engaging portion 901.

With the above configuration, it is possible to prevent the replacement module 800 from being attached in a wrong orientation. It should be noted that in the third embodiment, the regulating portion 801 is configured by a convex portion, and the engaging portion 901 is configured by a recess portion, but the regulating portion 801 and the engaging portion 901 are not limited to this. For example, the regulating portion 801 may be configured by a recess portion, and the engaging portion 901 may be configured by a convex portion.

Although the preferred embodiments of the present invention have been described above, the present invention is not limited to the embodiments described above, and various modifications and changes can be made within the scope of the gist thereof. In each of the embodiments described above, the digital camera is used as an application example of the electronic apparatus, and an operation member for operating the digital camera is used as an application example of the replacement module, but the present invention is not limited thereto. For example, the electronic apparatus may be a game machine. An application example of the replacement module in this case may be an operation member for operating the game machine, that is, a game controller. In addition, the replacement module is not limited to one having a function as an operation member.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., ASIC) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-069175, filed on Apr. 20, 2023, which is hereby incorporated by reference herein in its entirety.

What is claimed is:

1. A replacement module that is replaceably attached to an electronic apparatus, the replacement module comprising:

an exterior portion that constitutes a part of an exterior of the electronic apparatus in an attached state of being attached to the electronic apparatus;

a connection portion that is communicably connected to the electronic apparatus in the attached state;

a holding portion that holds the attached state; and an entering preventing portion that has a ring shape, in which the connection portion and the holding portion are disposed inside, and is configured by an elastic body that prevents foreign matter from entering the connection portion and the holding portion in the attached state, wherein the connection portion, the holding portion, and the entering preventing portion are disposed in a common plane on a surface facing a side opposite to the exterior portion, and wherein the entering-preventing portion is configured, in the attached state, to be elastically deformed so as to make continuous surface contact with an abutting portion of the electronic apparatus over an entire circumferential range, thereby hermetically sealing the connection portion and the holding portion.

2. The replacement module according to claim 1, wherein the replacement module is inserted into the electronic apparatus and becomes the attached state, and the entering preventing portion protrudes toward an insertion direction of the replacement module with respect to the electronic apparatus.

3. The replacement module according to claim 2, wherein a protruding top portion of the entering preventing portion is located at a higher position than the connection portion and the holding portion.

4. The replacement module according to claim 2, wherein the entering preventing portion has a tapered surface whose outer diameter gradually decreases toward the insertion direction or whose inner diameter gradually increases toward the insertion direction.

5. The replacement module according to claim 2, wherein the entering preventing portion is configured to, in the attached state, be elastically deformable by being compressed toward a direction opposite to the insertion direction and be elastically deformable by being compressed toward a radial direction.

6. The replacement module according to claim 1, wherein the holding portion is configured by a magnet.

7. The replacement module according to claim 6, wherein the holding portion is configured by at least two magnets, the two magnets are disposed side by side along the surface facing the side opposite to the exterior portion, and directions of magnetic forces of the two magnets are opposite to each other.

8. The replacement module according to claim 1, wherein a rotation operation of the replacement module is performed in the attached state, and the exterior portion functions as a finger rest portion on which fingers can be rested when the rotation operation is performed.

9. The replacement module according to claim 8, further comprising:

a detecting unit that detects the rotation operation.

10. The replacement module according to claim 1, further comprising:

a regulating portion that regulates an orientation of the replacement module with respect to the electronic apparatus in the attached state.

11. An electronic apparatus to which the replacement module according to claim 1 is replaceably attached, the electronic apparatus comprising:

the abutting portion that has a ring shape, elastically deforms the entering preventing portion in an attached state in which the replacement module has been attached, and makes surface contact with the entering preventing portion.

12. The electronic apparatus according to claim 11, wherein the replacement module is inserted into the electronic apparatus and becomes the attached state, the entering preventing portion has a first tapered surface whose outer diameter gradually decreases toward an insertion direction of the replacement module with respect to the electronic apparatus or whose inner diameter gradually increases toward the insertion direction, and the abutting portion has a second tapered surface that is inclined in the same direction as the first tapered surface and comes into surface contact with the first tapered surface in the attached state.

13. An electronic apparatus set comprising:

the replacement module according to claim 1; and an electronic apparatus to which the replacement module is replaceably attached.

\* \* \* \* \*